United States Patent [19]
Valyi

[11] 3,929,954
[45] *Dec. 30, 1975

[54] METHOD FOR THE PRODUCTION OF COMPOSITE CONTAINERS

[76] Inventor: Emery I. Valyi, 5200 Sycamore Ave., Riverdale, N.Y. 10471

[ * ] Notice: The portion of the term of this patent subsequent to Mar. 6, 1990, has been disclaimed.

[22] Filed: July 27, 1973

[21] Appl. No.: 383,264

Related U.S. Application Data

[62] Division of Ser. No. 211,898, Dec. 27, 1971, Pat. No. 3,816,580.

[52] U.S. Cl. .................................................. 264/97
[51] Int. Cl.² ...................... B29C 17/07; B29F 1/10
[58] Field of Search ............ 264/89, 90, 92, 94, 97, 264/247, 255, 275, 278, 250, 327; 425/125, 126, 129, 242 B, 324 B, 387 B, DIG. 209, DIG. 234

[56] References Cited
UNITED STATES PATENTS

| | | | |
|---|---|---|---|
| 3,247,550 | 4/1966 | Haines, Jr. | 264/275 X |
| 3,412,186 | 11/1968 | Piotrowski | 264/97 X |
| 3,555,618 | 1/1971 | Cooper | 425/129 |
| 3,719,735 | 3/1973 | Valyi | 264/92 X |

*Primary Examiner*—Jan H. Silbaugh
*Attorney, Agent, or Firm*—Robert H. Bachman

[57] ABSTRACT

Method for the production of injection blow molded containers having a preformed inner lining which is applied to the core of the injection molding tool without immediate direct contact with the heated portions of that core.

9 Claims, 6 Drawing Figures

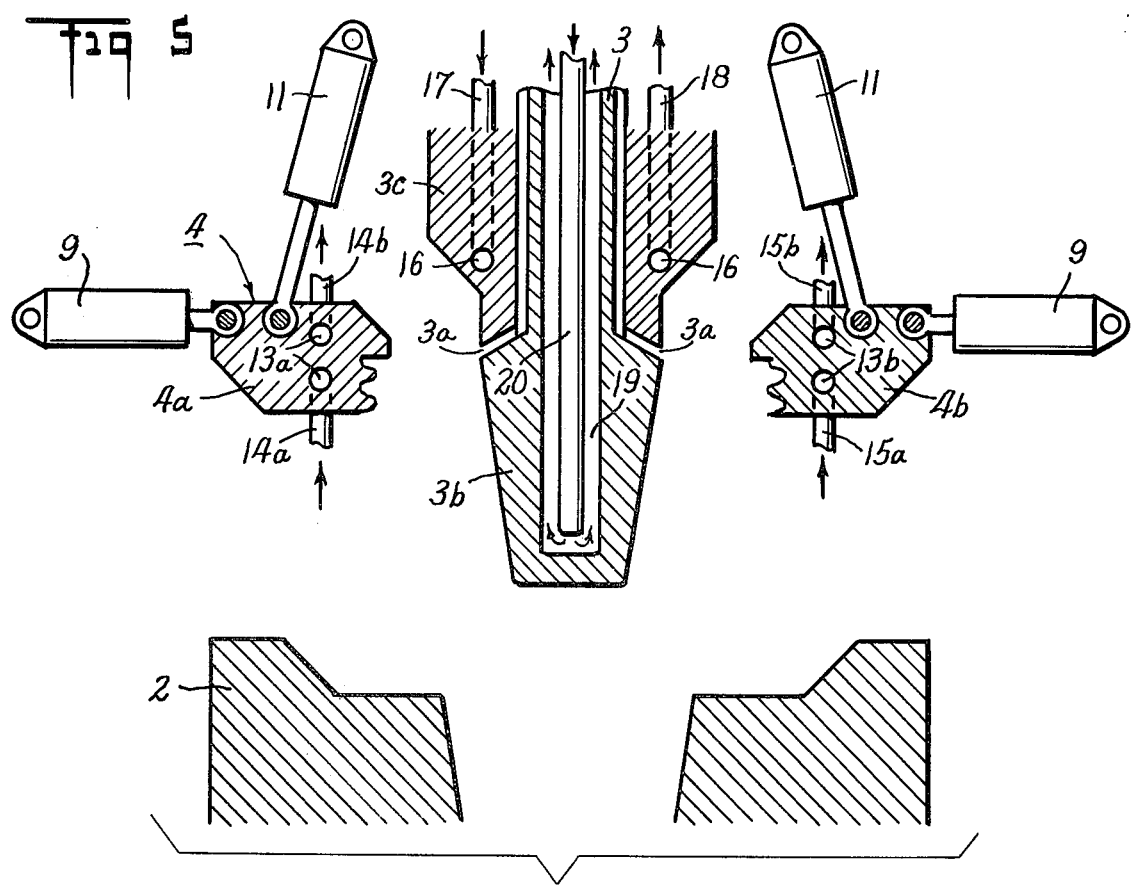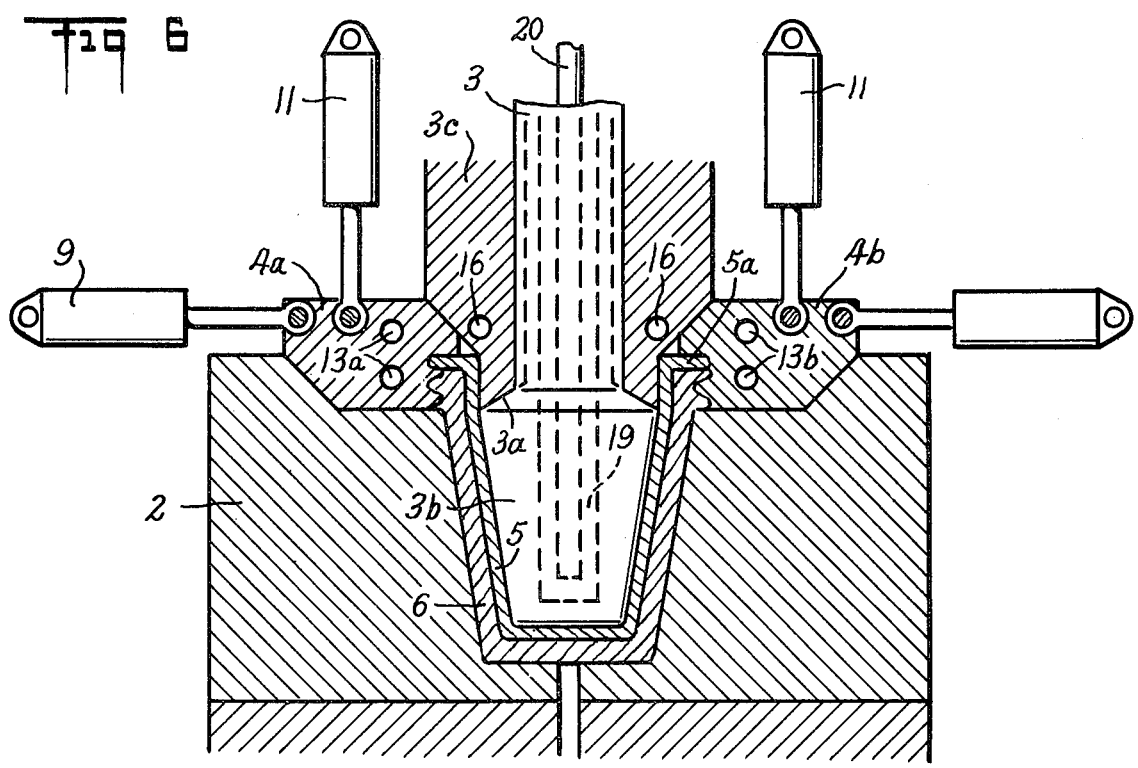

METHOD FOR THE PRODUCTION OF COMPOSITE CONTAINERS

This is a division of application Ser. No. 211,898, filed Dec. 27, 1971, now U.S. Pat. No. 3,816,580.

This invention relates to a method for the use of liners intended to provide an inner layer of injection blow molded parisons. Parisons containing such inner layers are used for the production of composite hollow articles, such as containers, as more fully described in my co-pending U.S. Pat. application Ser. No. 71,734, filed Sept. 14, 1970, now U.S. Pat. No. 3,717,544, according to which previously formed sleeve-like liners are applied to the blow core of an injection blow molding apparatus, plastic is injected around said liners while upon the cores and the resultant composite parison, consisting of the liner and the injected plastic, is expanded together into conformance with a blow mold. The method of injection blow molding is well known and described, for example, in U.S. Pat. No. 3,029,468 and other patents.

More broadly, the invention relates to the manuof plastic articles composed of two or more components. According to my above-named patent application, a liner, whose shape conforms to that of the blow core, is produced by one of several possible methods, depending on the size and shape of such liner and upon the material from which it is to be made. For example, liners may be made by electrostatic deposition, by coating in a fluidized bed, by pressure molding, by blowing or by forming from sheet stock.

Several of these procedures for the making of liners entail severe deformation of the plastic at elevated temperature, under conditions rendering the production of stress-free liners frequently virtually impossible. As is well known, such stressed articles cannot withstand being heated subsequent to the forming process to which they have been subjected, without exhibiting severe deformation. For example, liners made from sheet stock, as by thermoforming, will tend to shrink and even shrivel up, if heated to a temperature approaching that at which they were previously formed.

As described in my patent application previously referred to, the cores onto which liners are applied must usually be heated, at times to a temperature near that used for injecting plastic around them, in order to heat the liners quickly and uniformly to the temperature at which they are to expand as part of the parisons.

It is therefore difficult to apply liners that tend to deform upon contact with a heated surface, without causing such deformation to take place before there is time to inject plastic around the liners.

It is an object of the invention to provide a method for the application of liners without experiencing liner distortion even when heated cores are used.

Another object is to carry out the said method in connection with conventional injection blow molding tools and machines.

In accordance with one embodiment of the present invention, the liners are applied to the cores in two stages. In the first stage, the liners are placed into the immediate proximity of the cores, by means of a spacer which may be formed by a mold component such as neck-mold, in such a way that they are held in an accurate predetermined spacial relationship with the cores, but at a sufficient distance from the heated portions of the core surfaces to preclude direct transfer of heat by conduction from the cores to the liners. In the second stage, the liners are forced into full contact with the cores, resulting in conductive heat transfer from one to the other, whereby such contact is established only as the molten plastic is pressed around the liners or, at least, at such short an interval of time before that moment that the liner cannot shrink or otherwise deform, between the time of its contact with the core and the time it is surrounded by the entering molten plastic.

According to another embodiment of the present invention, the cores are provided with at least one region that is maintained at a temperature which is lower than the deformation temperature of the liners. Therefore the liners remain undeformed in the corresponding areas of contact with the core and are thereby made capable of resisting unwanted deformation.

The nature of the invention will be better understood from the following description taken in connection with the accompanying drawings in which FIG. 1 is an elevation, partly in section, of an injection blow molding apparatus including a parison mold and a blow mold, in schematic representation;

FIG. 5 shows an assembly according to FIG. 2 having temperature control means; and FIG. 6 shows an assembly according to FIG. 5 with the blow slot closed.

Figure 1:
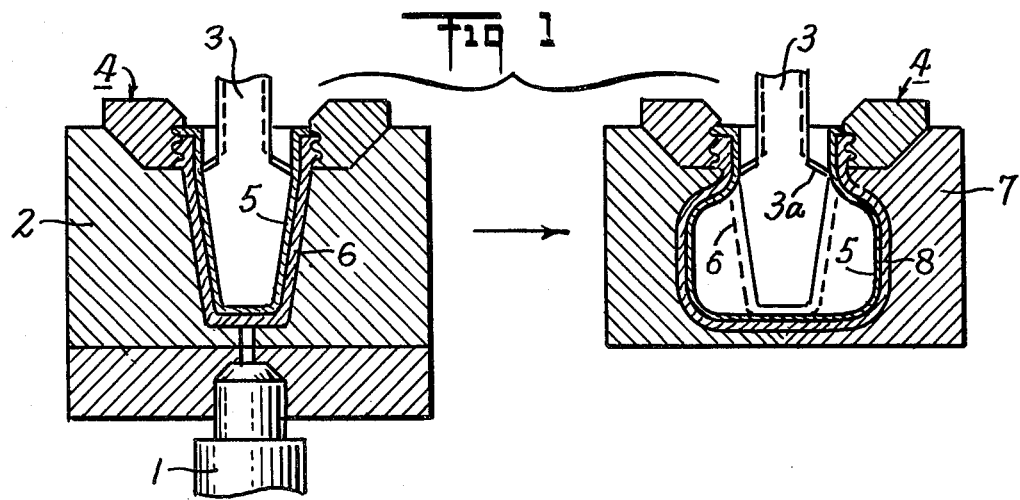

Referring to the drawings in more detail, an injection blow molding apparatus is shown in FIG. 1 for the purpose of identifying the process steps and the several functional parts of that apparatus. An injection nozzle 1 is provided to furnish molten plastic at high pressure to the parison mold assembly, consisting of parison mold 2, blow core 3 and neck-mold 4.

In operation, a previously produced liner 5 having a shape conforming to the shape of blow core 3 is applied to the blow core which is then clamped together with the parison mold 2 and the neck-mold or spacer 4 with sufficient force to withstand the pressure of the plastic which is immediately thereafter caused to enter the parison mold through nozzle 1, thereby forming parison 6. The means for clamping the parison mold assembly and for providing molten plastic under pressure are well known and not shown here.

After production of the composite parison as above described, the blow core 3 and the neck-mold 4 carry the parison 6 into a blow mold 7. The blow mold assembly thus formed, consisting of the blow mold 7, blow core 3 and neck-mold 4 is now clamped together by known means (not shown) and fluid pressure e.g. air is applied inside the parison 6 through a blow valve or blow slot 3a. Since the blow core is usually heated by internal means (not shown in FIG. 1), such as by hot fluid circulation, or electrically, and due to the heat transmitted by the freshly injected hot plastic, the liner 5 will have assumed a sufficiently high temperature for expanding in unison with the injected portion of the parison 6. The finished article 8 is thus formed in the blow mold, having an inner and outer layer, the former being the liner 5 in expanded form. The article 8 is next removed and the several elements of the apparatus are available for the next cycle. As is known, the parison mold 2, the blow mold 7 and the neck-mold 4 may be made of a single piece, or consist of several pieces that are movable relative to each other, in order to facilitate removal of the finished article. Whenever that is the case, appropriate actuators for the respective pieces are provided, as is customary. The blow slot 3a is usually closable, and if so, the blow core 3 consists of at least two parts, the poppet 3b and the sleeve 3c which may be moved relative to each other in order to open and close the blow slot 3a by conventional means, not shown.

Figure 2:
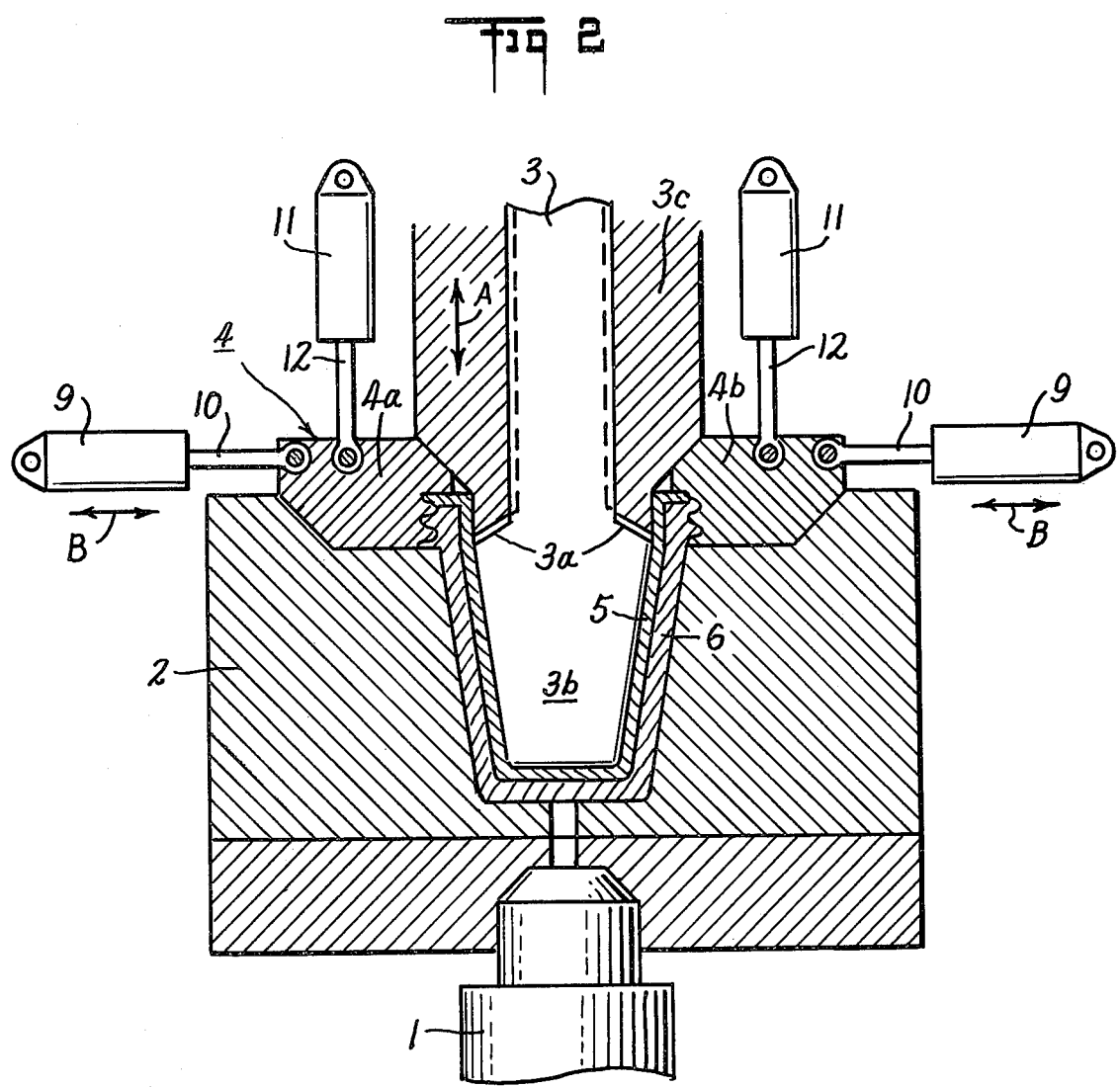
FIG. 2 is an enlarged view of the parison mold assembly showing further details of the neck-mold actuating devices.

An enlarged view of the parison mold assembly in the parison molding position is shown in FIG. 2, in which like numerals designate like parts as in FIG. 1. Blow slot 3a is shown in open position in FIG. 2, in which apparatus for the actuation of the neck-mold 4 is also shown. According to FIG. 2, the neck-mold 4 is intended to produce a neck having external threads which can be removed from the neck-mold only by separating neck-mold halves 4a and 4b. In other instances, as for example if the neck or top of the article to be made has the shape of a bead, such separation is not necessary and the neck-mold may be of single-piece construction. In order to separate and close the neck-mold halves 4a and 4b, conventional hydraulic cylinders 9 are provided actuated by a known pump and valve assembly, not shown. These cylinders engage the neck-mold halves by means of piston rods 10 and thereby enable cylinders 9 to actuate the neck-mold halves 4a and 4b in the direction of arrow B in FIG. 2. The neck-mold assembly is moreover connected to the cylinders 11 by means of piston rods 12, thereby providing means for moving the neck-mold assembly in the directions of Arrow A in FIG. 2.

The position of the parison assembly accoding to FIG. 2 corresponds to the point in the operating cycle of the apparatus which follows immediately after injection of plastic through nozzle 1, all components of the assembly being shown in the clamped condition and the parison mold 2 containing the composite parison consisting of liner 5 and parison portion 6 which has been injected around the liner.

Figure 3:
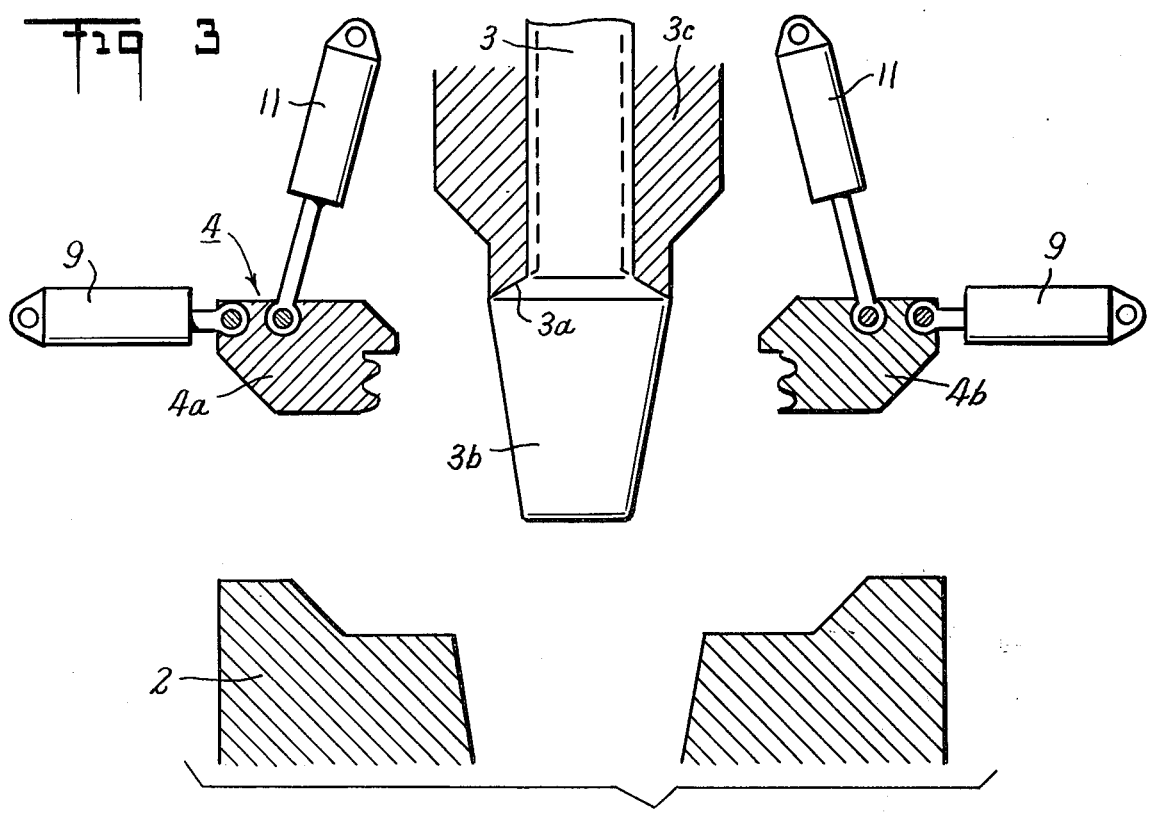
FIG. 3 shows the assembly according to FIG. 2 before the introduction of a liner.

In further operation, the parison is transferred to the blow mold, is blown, the resulting finished article 8 removed and the parts necessary to complete the parison assembly, namely blow core 3 and neck-mold 4, with their corresponding actuators, are returned into alignment with the parison mold 2, as shown in FIG. 3, preparatory to being clamped together therewith.

In accordance with the present invention a preformed liner is positioned in the neck mold while the blow core is at least partially retracted from the neck mold, or conversely while the neck mold is at least partially advanced from its seated position around the blow core. It is understood that the terms "advanced" and "retracted" are used herein to refer to relative movement between the respective parts and that either of the parts may be moved with respect to the other in order to effect the desired relative displacement.

Figure 4:
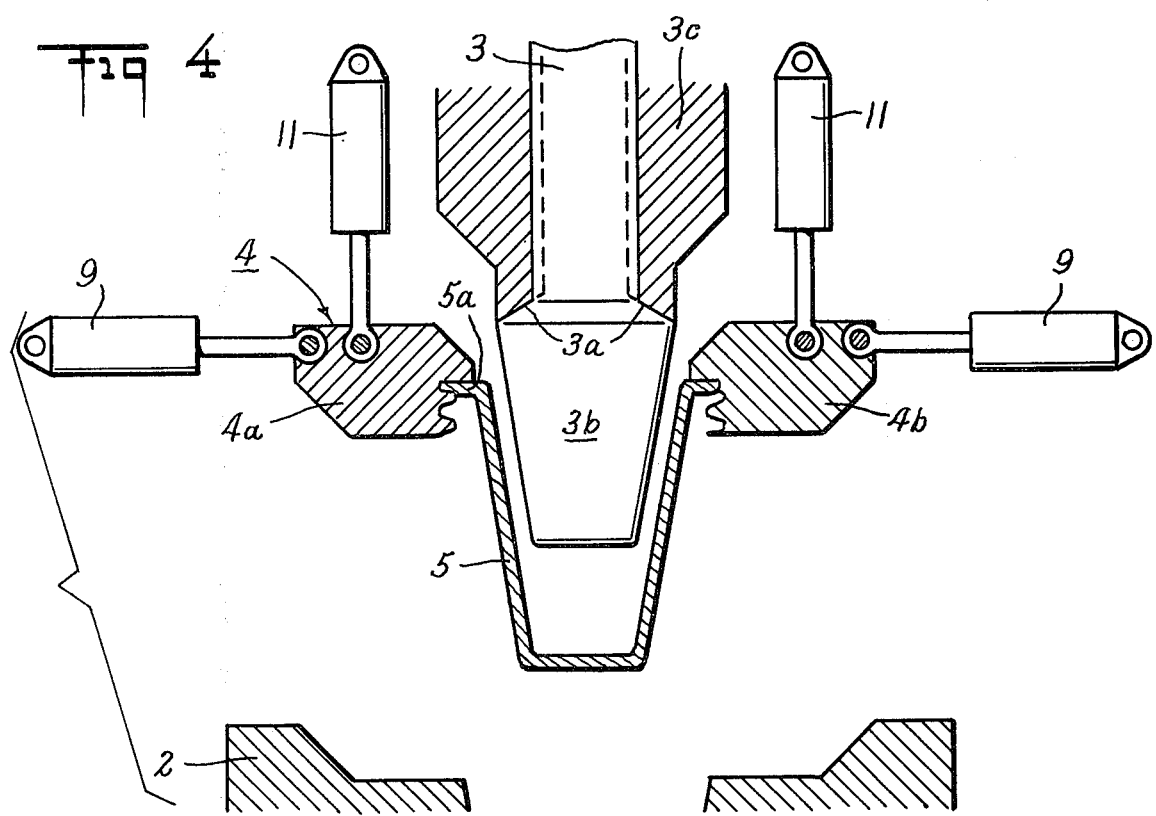
FIG. 4 shows the assembly according to FIG. 3 after introduction of a liner and with the blow core partially inserted in the process of closing the mold for molding the parison.

While the liner is positioned in the neck mold with the blow core retracted as above described, the surface of the blow core is spaced from the liner due to the tapered contour of the parts. The blow core, neck mold and liner are then advanced axially into the parison mold while retaining the parts in the same relative, spaced position until the neck mold reaches its seated position in the parison mold. When this occurs, the liner is fully introduced into the parison mold and further movement of the neck mold and liner is stopped. The blow core however continues its movement into the parison mold and into the liner. The liner thus comes into full surface contact with the blow core only at the instant at which the blow core becomes fully seated and in molding position. Heat transfer from the hot blow core to the liner is thus retarded until the parts are seated and plastic injection begins. The liner is thus not heated to a point at which it would tend to shrink on the blow core until it comes in contact with both the blow core and the injected plastic, at which point the pressure of the injected plastic holds the liner in place and prevents relative movement with respect to the blow core. FIG. 3 shows the neck-mold halves 4a and 4b separated for receiving the liner and also advanced from its seated position with respect to the blow core in the direction of arrow A (FIG. 2), under the action of cylinders 11. In further operation the neck-mold halves 4a and 4b are closed again, but the neck-mold assembly remains spaced away from the blow core assembly as shown in FIG. 4. Liner 5 is now positioned by external means (not shown) into alignment with blow core 3 and it is advanced until the top rim 5a of line 5 is in position to be carried by the corresponding surface of the neck-mold. For that purpose the neck-mold may be closed and the liner rims 5a or selected portions thereof, if made of comparatively flexible material, are caused by the external positioning device to snap over interfering portions of the neck mold such as for example the thread contours shown in FIG. 4. Another procedure for that purpose is to leave the neck-mold halves 4a and 4b separated until the external positioning device will have placed the liner 5 into a position such that, upon closing of the neck-mold halves 4a and 4b, the liner rim 5a will rest upon the neck-mold, as before. Other means for retaining the liners upon the neck-mold may be brought about by suitable design of the matching surfaces, the neck-mold 4 and blow core sleeve 3c.

For purposes of injection blow molding, the blow core poppet 3b is heated to a temperature which depends on the material being molded and which may reach 400°F. The parison mold 2 is also heated, to a temperature usually below that of the blow core poppet.

The blow core sleeve 3c is usually cooled by fluid circulation or by air, as is the neck-mold 4.

Accordingly, in operation as shown in FIG. 4, the liner 5 is positioned in such a manner that it is spaced from the heated portions of the blow core assembly.

In the method described, the liner 5 may be accurately positioned for its intended location in the parison mold assembly without touching the heated portions of the blow core 3 until the very instant of closing of the parison mold assembly which can be arranged to occur a fraction of a second before the injection step. Liner 5 is then brought into contact with the blow core poppet 3b as relative movement of the parison mold 2 and the neck mold 4 and core sleeve 3c urges the neck mold 4 — which carries liner 5 — into contact with blow core sleeve 3c, as shown in FIG. 1.

An arrangement of temperature control means is shown in FIGS. 5 and 6 in which fluid cooling of the neck mold 4a and 4b is provided through channels 13a and 13b into which the cooling fluid, usually water, is caused to flow through tubes 14a and 14b; and 15a and 15b respectively, in the direction of the arrows. Blow core sleeve 3c is cooled by means of fluid circulating through channel 16 flowing into that channel through conduit 17 and out of the channel through conduit 18. The blow core poppet 3b is heated by fluid entering through tube 20 into cavity 19 and flowing through that cavity as indicated by arrows.

Another procedure for applying liners is, accordingly, to provide a substantial difference between the temperatures of the blow core poppet 3b and the blow core sleeve 3c. Due to the fact that the two blow core components are in contact particularly also at the surfaces that are to form the blow slot 3a, heat is transmitted from one to the other, tending to heat blow core sleeve 3c to a temperature sufficient to deform liner 5. In order to maintain the temperature of the blow core poppet 3b at the desired low level, the blow slot 3a is opened as shown in FIG. 5 prior to the application of the liner 5 and kept open substantially throughout the molding cycle, except at the stage of pressure molding. During that stage, shown in FIG. 6, the blow slot 3a is closed by external means (not shown) or by the pressure of the plastic supplied from injection nozzle 1. Accordingly, the contact between the blow core sleeve 3c and blow core poppet 3b is minimized and the desired low temperature of the sleeve is thereby readily maintained.

In some instances, depending upon the nature of the material employed, distortion of the liner may be avoided by clamping the neck portion of the sleeve against the relatively cool sleeve which therey maintains the neck portion at a temperature suited to provide the necessary strength or rigidity for holding the neck portion in place and thereby opposing the forces tending to produce distortion in the more highly heated portion of the liner. In such cases, the transfer of heat from the poppet to the sleeve may be reduced by maintaining the blow slot open and the sleeve spaced from the heated surface of the poppet. If it is found that this procedure is not sufficient to prevent undesired distortion of the liner, the liner may be maintained in spaced relationship with the hot poppet until the point of injection of the plastic as described above.

While the procedure of separating the two blow core components for the purpose of improved temperature control has been described in connection with the use of liners, such procedure may be used advantageously regardless of the simultaneous employment of liners such as in normal injection blow molding carried out according to known procedures, whenever the products to be injection blow molded can benefit from a difference between the cooling rates of different portions of the molded article.

In other instances, if the nature of the liner is such that excessive shrinkage is not ordinarily produced, the premature shrinkage may be avoided by slightly roughening the surface of the blow core itself, as for example by sandblasting or mechanical grooving. This introduces friction which opposes the shrinkage forces and holds the liner in place until the injection is completed. In any case, the liner is maintained under dimensionally stable conditions up to the point of injection of the hot plastic.

As the plastic layer cools and shrinks around the liner on the blow core, the two layers are held in close contact throughout their entire contacting areas. While they are still at a temperature suited for blowing, the blow core with the composite parison thereon is introduced into the blow mold and the parison is blown into the shape of the finished article. The liner and the plastic layer are expanded together and retain their intimate contact in the blown article.

What is claimed is:

1. In the method of making a composite plastic article using a previously formed plastic liner which is subject to deformation upon heating, while preventing substantial deformation of said previously formed liner, wherein a parison is formed on a blow core in a parison mold, said core having heated portions, and is expanded in a blow mold, the improvement comprising providing said previously formed liner generally conforming to the shape of at least part of said core, positioning said liner in alignment with the core, holding said heated portions and liner at least partly in spaced relationship until positioning the core for molding, bringing said liner and said core into molding position with said parison mold and applying said liner to said core as the core and said parison mold are being positioned for molding, thereby preventing substantial deformation of said liner.

2. The method as set forth in claim 1 in which said liner and said core are advanced into said parison mold while at least partly in spaced relationship.

3. The method according to claim 1 in which the liner is placed into molding position in said parison mold in advance of said core and the core is brought into full contact with said liner when said liner is in said molding position.

4. The method as set forth in claim 1 including the steps of transferring said parison to a blow mold and expanding said parison in said blow mold to form said composite plastic article.

5. The method as set forth in claim 1 in which a portion of the core is heated and the liner is held spaced from such heated portion until the core is seated in the parison mold for forming a parison therearound.

6. The method set forth in claim 5 in which said core includes a heated poppet portion and a cooled sleeve and a portion of said liner is retained upon said sleeve.

7. The method set forth in claim 6 in which a closable blow slot is formed between said sleeve and said poppet and said sleeve is held spaced from said poppet with the liner thereon prior to the time of forming the parison.

8. The method of claim 1 in which the core and liner are maintained in spaced relationship until the core is seated in the parison mold and pressure molding a plastic around the core and liner in said mold.

9. The method of claim 1 in which the liner is carried in a spacer member and is at least partially introduced into the parison mold in advance of the core.

* * * * *